(12) United States Patent
Takamatsu et al.

(10) Patent No.: US 6,449,957 B1
(45) Date of Patent: Sep. 17, 2002

(54) GAS TURBINE GENERATOR PLANT WITH EQUIPMENT SUPPORT

(75) Inventors: Masaru Takamatsu, Takasago (JP); Hidekazu Nagai, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/984,121

(22) Filed: Sep. 21, 2001

Related U.S. Application Data

(63) Continuation of application No. 09/138,526, filed on Aug. 24, 1998, now abandoned.

(30) Foreign Application Priority Data

Aug. 25, 1997 (JP) .............................................. 9-228170
Sep. 25, 1997 (JP) .............................................. 9-259900

(51) Int. Cl.[7] .................................................. F02C 7/20
(52) U.S. Cl. .......................................... 60/796; 60/801
(58) Field of Search ........................ 60/39.5, 796, 797, 60/798, 801

(56) References Cited

U.S. PATENT DOCUMENTS

| 3,418,485 A | 12/1968 | Anderson et al. |
| 4,002,023 A | 1/1977 | Hartmann .................. 60/39.33 |

FOREIGN PATENT DOCUMENTS

| GB | 684428 | 12/1952 |
| GB | 718632 | 11/1954 |
| GB | 1026910 | 4/1966 |
| GB | 1150147 | 4/1969 |

OTHER PUBLICATIONS

General Electric. "General Electric Heavy Duty 5001 Gas Turbines" (product brochure), 1976. pp. 16–17.

*Primary Examiner*—Louis J. Casaregola
(74) *Attorney, Agent, or Firm*—Oblon, Spivak, McClelland, Maier & Neustadt, P.C.

(57) ABSTRACT

A gas turbine generator plant is provided in which, by forming auxiliary equipment, including a starter, a lubricating oil device, a control oil device, and a lubricating oil main tank, into a unit, the auxiliary equipment may be disposed with a building in a unitary manner with a generator and a gas turbine unit. The auxiliary equipment is made unitary to form the unitary auxiliary equipment. The unitary auxiliary equipment, the generator, and the gas turbine unit are disposed first, second, and third, respectively, within the building. Thus, the installed floor area of the plant may be dramatically reduced and in turn, construction costs may also be reduced. Furthermore, the unitary auxiliary equipment can be transported in one piece under a water resistant cover, so that it is possible to limit, all at once, the occurrence of rust on the unitary auxiliary equipment that could result from exposure to salt air during sea transport. The packing may also be high-density so as to reduce transportation costs. Furthermore, there are also few installation points to reduce installation costs. In addition, only a single dedicated crane need be installed to carry out the maintenance to further save costs.

9 Claims, 9 Drawing Sheets

GAS TURBINE GENERATOR PLANT WITH EQUIPMENT SUPPORT

This is a continuation of Ser. No. 09/138,526 filed Aug. 24, 1998 (abandoned).

BACKGROUND OF THE INVENTION

1. Technical Field

The present invention relates to a gas turbine generator plant in which a generator and a gas turbine unit maybe disposed in a unitary manner within a building by means of making auxiliary equipment, comprising a starter, a lubricating oil device, a control oil device, and a lubricating oil main tank into a unit.

2. Related Art

FIG. 10 is a sketch showing the common arrangement of a conventional gas turbine generator plant. A gas turbine unit 80 a generation 81, and a lubricating oil main tank 91 are illustrated. Lubrications oil auxiliary equipment 92 is disposed above the lubricating oil main tank 91. A starter 93 serves to start the generator 81. A speed reducer 94 is coupled to the starter 93 and to the axle of the generator 81. A fuel oil control unit 95 and a fuel oil pump 96 are illustrated. The lubricating oil main tank 91, lubricating oil auxiliary equipment 92, fuel oil control unit 95, and fuel oil pump 96 save the necessary portions thereof connected to the gas turbine unit 80, the generator 81, and the starter 93 via wiring and piping 82.

In the conventional gas turbine generator plant having the structure described above, the lubricating oil main tank 91, the lubricating oil auxiliary equipment 92, the starter 93, the speed reducer 94, the fuel oil control unit 95, and the fuel oil pump 96 all have different purposes and occupy different positions. The positions occupied by the lubricating oil main tank 91, the lubricating oil auxiliary equipment 92, the starter 93, the speed reducer 94, the fuel oil control unit 95, and the fuel oil pump 96 are all appropriate to the use thereof. The lubricating oil main tank 91, the lubricating oil auxiliary equipment 92, the starter 93, the speed reducer 94, the fuel oil control unit 95, and the fuel oil pump 96 are disposed within the planar space in the vicinity of the gas turbine unit 80 and the generator 81.

During the withdrawal of the rotors of the gas turbine unit 80 or generator 81 large parts, such as the rotors and similiar are convential manipulated using large-scale overhead cranes, or maintenance cranes disposed at each device. Thus, the floor area of the building housing the gas turbine generator plant is large, resulting in complex transportation, installation, and maintenance, this necessarily involves large increases in cost.

Furthermore, the following problems are a result of such a planar arrangement.

Since the equipment is arranged in a planar fashion, the floor area of the building required for the installation of the plant is large.

Because the machines are disposed in an individualized fashion, transportation thereof is time consuming, and installation is also complex, and this leads to increases in cost'.

Because maintenance cranes are required for each device, the structure of the building is complex, and there is duplication of the equipment.

SUMMARY OF THE INVENTION

The present invention was developed in order to solve the problems described above. The chief features of the gas turbine generator plant of the invention include auxiliary equipment comprising a starter, a lubricating oil device, a control oil device, and a lubricating oil main tank, which are disposed in a compact fashion and which are made unitary. This unitary auxiliary equipment can be coupled with a gas turbine unit and a generator in a single unit, into an arrangement which reduces the floor area of the building. Thus transport, installation, and maintenance are all simplified in comparison to the conventional technology, and a gas turbine generator plant is provided at reduced costs.

The gas turbine generator plant of the present invention is provided with a generator, a gas turbine unit, and auxiliary equipment. The auxiliary equipment includes a starter, a lubricating oil device, a control oil device, and a lubricating oil main tank. The auxiliary equipment is made unitary, and the unitary auxiliary equipment, the generator, and the gas turbine unit are disposed in that order within a building.

In the gas turbine generator plant of the present invention, auxiliary equipment is made so that the floor area required for the plant is greatly reduced, and installation costs are also reduced. Furthermore, the unitary auxiliary equipment can be transported in one piece, so that if a covering is provided, the amount of rust on the auxiliary equipment resulting from exposure to salt during sea transport may be reduced. Highly compact packing of the unitary auxiliary equipment is also possible, so that transportation costs may be reduced. Furthermore, the installation points are also reduced in number, so that the number of installation man hours or the amount of man power necessary for installation is dramatically reduced. Furthermore, only one dedicated crane need be provided for maintenance, so that maintenance of all the auxiliary equipment may be easily carried out at a savings in cost.

As described above, by making the auxiliary equipment unitary, it is possible to dramatically reduce the installed floor area of the plant. Furthermore, it is possible to transport the unitary auxiliary equipment in one piece, so that transportation costs may also be reduced. Furthermore, the installation points are also reduced in number, so that it is also possible to reduce installation costs. Additionally, plant maintenance may also be easily conducted by providing a single dedicated crane.

DESCRIPTION OF THE PREFERRED EMBODIMENTS

Hereinbelow, preferred embodiments of the present invention will be concretely explained based on the figures.

Figure 1:
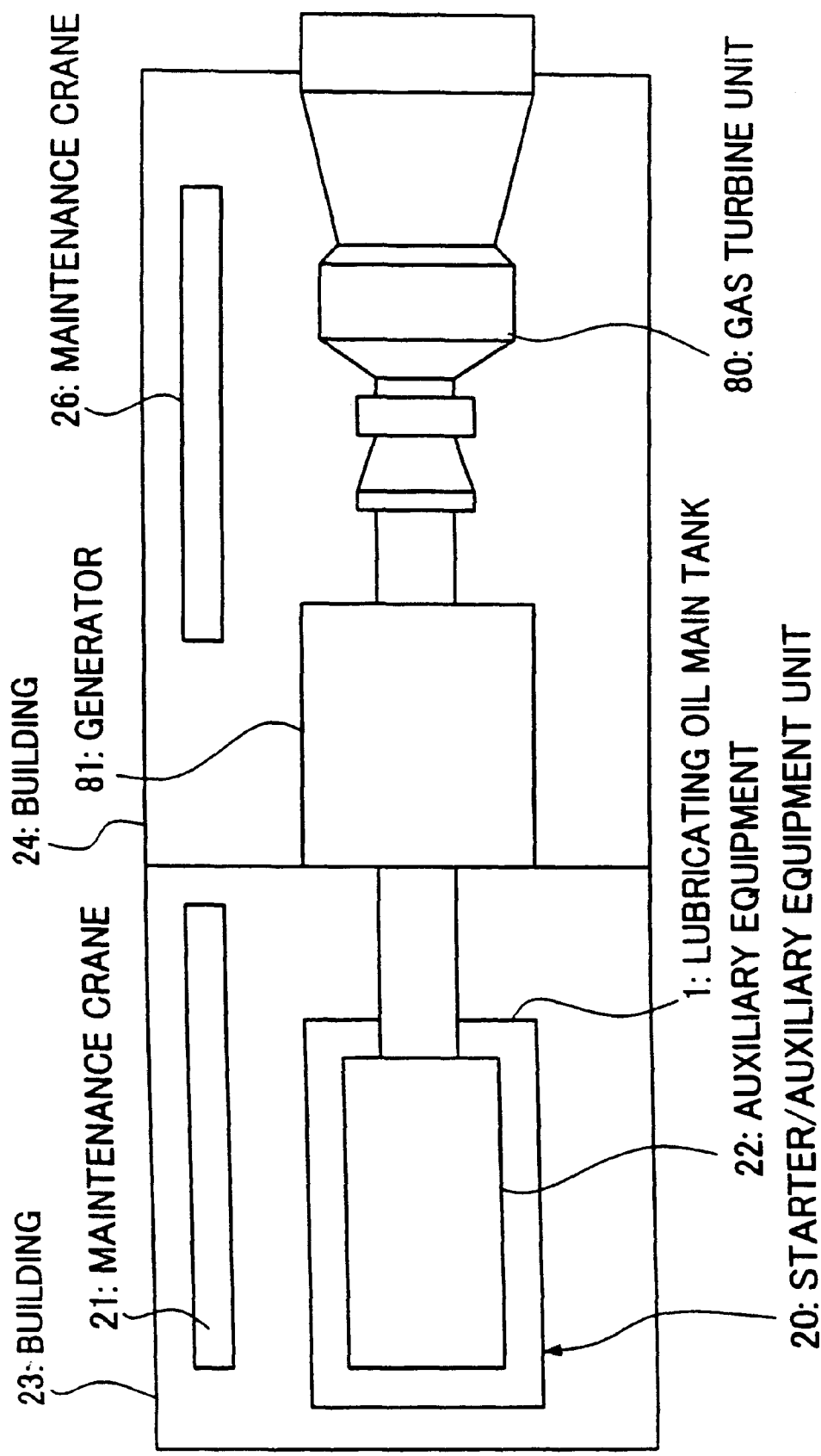
FIG. 1 is a top view showing the entire structure of a gas turbine generator plant in accordance with an embodiment of the present invention.

FIG. 1 is a top view showing the entirety of the structure of a gas turbine generator plant in accordance with an embodiment of the present invention. In FIG. 1, a starter/auxiliary equipment unit 20 includes a starter 2 (see FIG. 2) for starting the gas turbine and auxiliary equipment 22 the auxiliary equipment 22 includes various auxiliary equipment of the lubricating oil system, which are disposed on the upper surface of lubricating oil main tank 1. The auxiliary equipment 22 is constructed so as to form a unit with the lubricating oil main tank 1.

Figure 4:
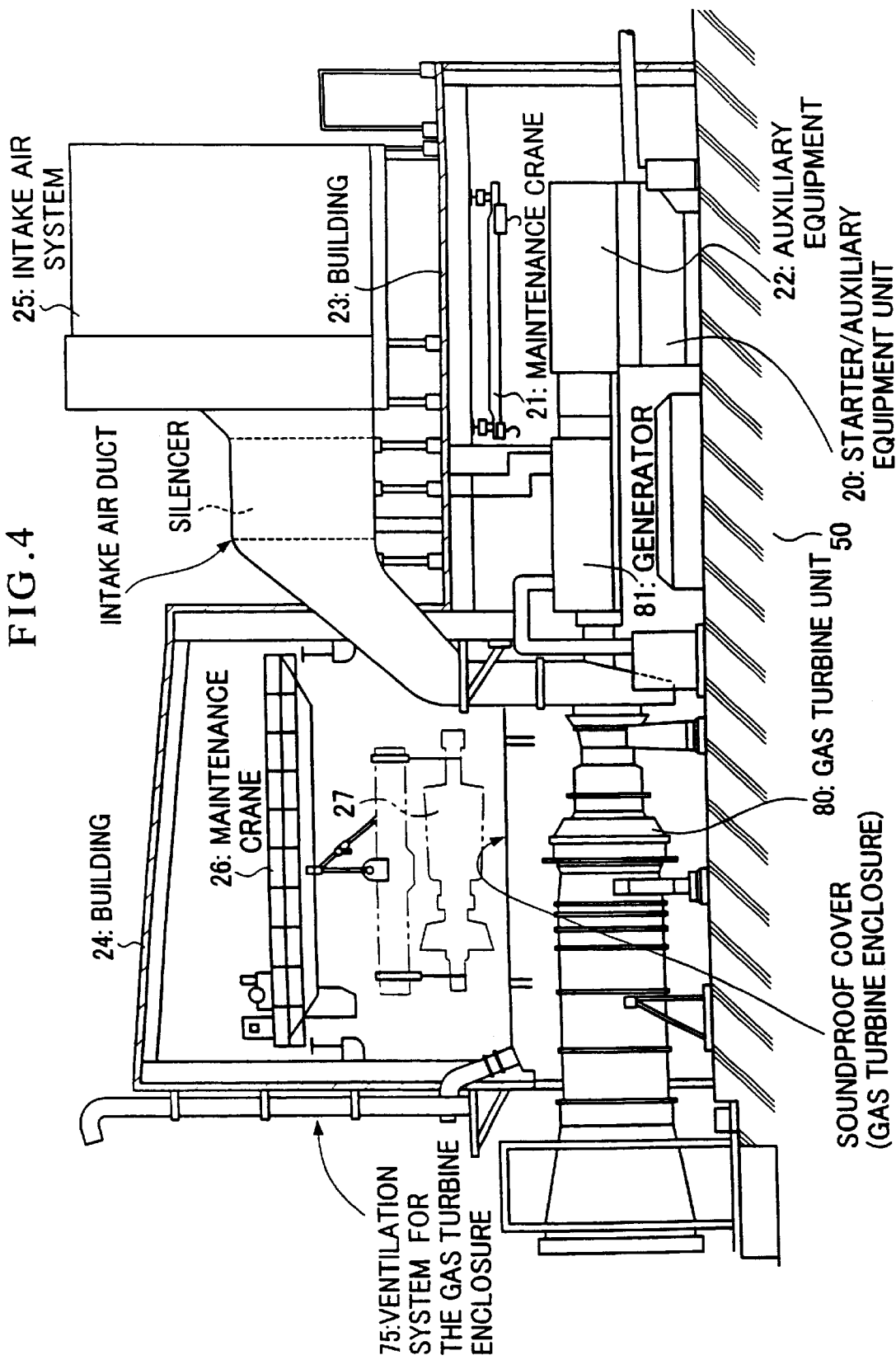
FIG. 4 is a side view showing the details of the structure of a gas turbine generator plant in accordance with an embodiment of the present invention.

A small maintenance crane 21 is installed on the ceiling of a building 23. The crane 21 is for maintenance the auxiliary equipment 22, withdrawal of the rotors of the generator 81, and similar. As shown in FIG. 4, an intake air system 25 is installed on top of the roof of the first building 23. A second building 24 houses a, generator 81 and a gas turbine unit 80 which are disposed so as to be directly connected to one another. The second building 24 is built so that there is a large amount of space above the gas turbine unit 80. Additionally, within the second building 24, a large maintenance crane 26 so as to be dedicated for the gas turbine unit 80. The crane 26 accomplishes is disposed, the hoisting of the gas turbine, and similar during maintenance. The first and second buildings 23 and 24 have the same a foundation 50.

Figure 2:
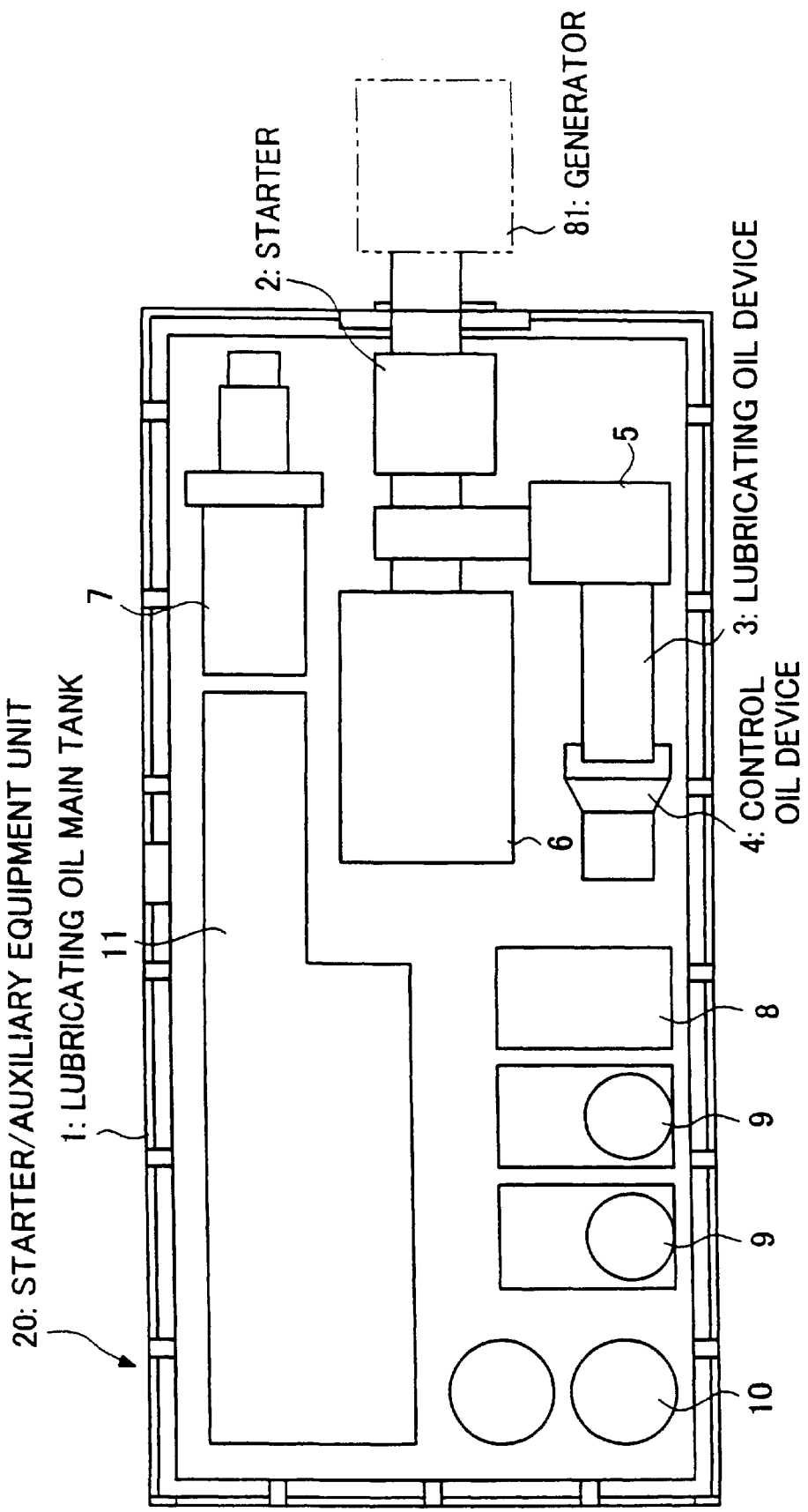
FIG. 2 is a top view showing the starter/auxiliary equipment unit in a gas turbine generator plant in accordance with an embodiment of the present invention.
Figure 3:
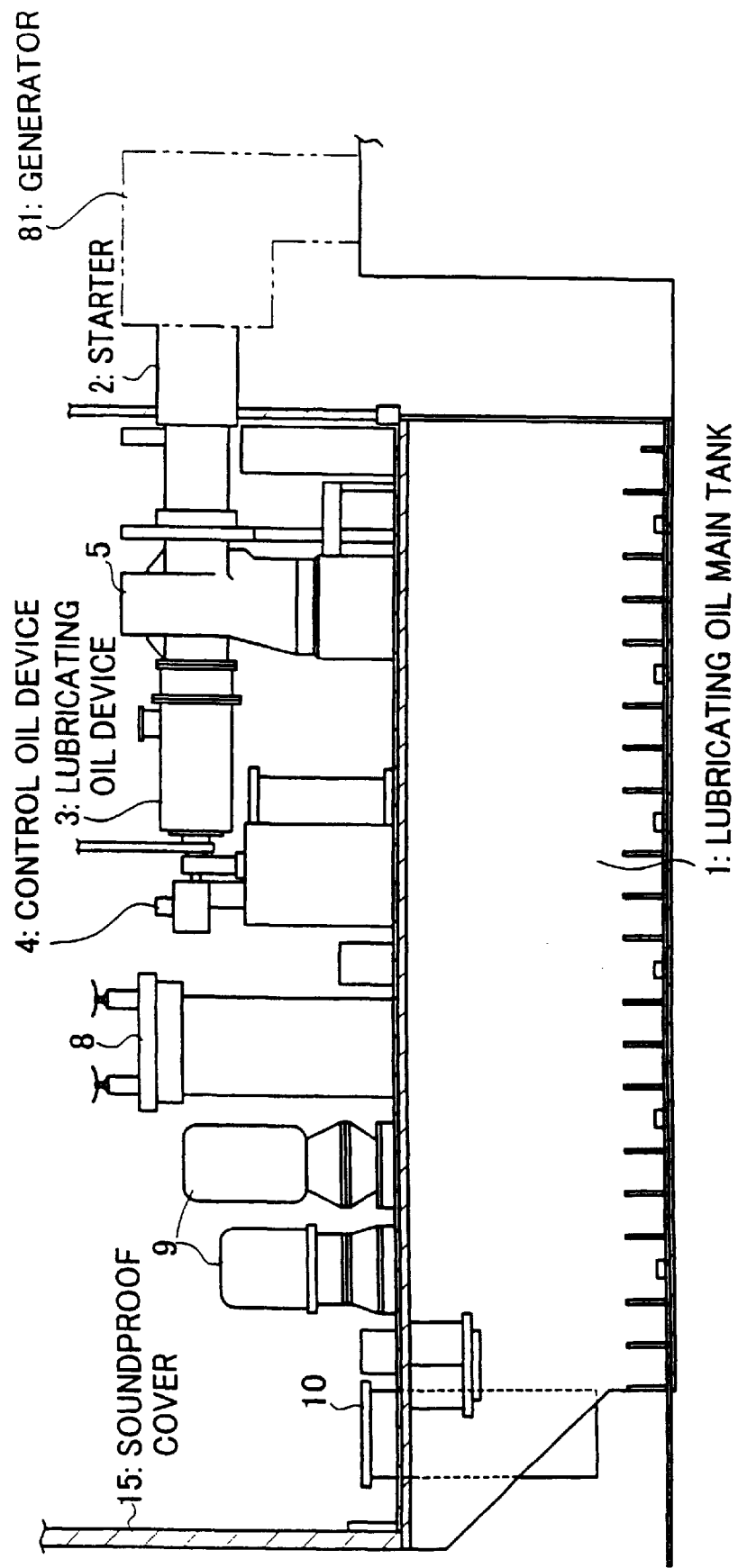
FIG. 3 is a side view showing the starter/auxiliary equipment unit in a gas turbine generator plant in accordance with an embodiment of the present invention.

FIGS. 2 and 3 show the details of the structure of the starter/auxiliary equipment unit 20 of the gas turbine generator plant in accordance with the present embodiment. FIG. 2 shows a top view, while FIG. 3 shows a side view. In both FIGS. 2 and 3, the starter/auxiliary equipment unit 20 includes a starter 2 for the gas turbine unit 80 and auxiliary equipment 22 including various auxiliary equipment of the lubricating oil system, such as the lubricating oil device and the control oil device. The auxiliary equipment 22 is installed on the lubricating oil main tank 1, and is made unitary with the lubricating oil main tank 1. The unitary auxiliary equipment 22 is built so as to be connected to the generator 81.

Hereinbelow, the features thereof will be discussed in detail.

In FIGS. 2 and 3, and various, such as the starter 2, the lubricating oil device 3, the control oil device 4, a gear device 5, and a starting motor 6 are provided on the upper surface of the lubricating oil main tank 1. FIGS. 2 and 3 also illustrate a turning motor 7, a control oil tank and filter 8, a lubricating oil pumps 9 lubricating oil filter 10, other auxiliary experiment 11. The auxiliary equipment 11 is also provided on the upper surface of the lubricating oil main tank 1. The auxiliary equipment 22 includes the various devices described above, from starter 2 to starting motor 6, and from turning motor 7 to the other auxiliary equipment 11. The auxiliary equipment 22 is incorporated on a unitary manner onto the upper surface of the lubricating oil main tank 1 to form the starter/auxiliary equipment unit 20.

A soundproofing cover 15 is attached on the periphery of the upper surface of the lubricating oil main tank. The sound proofing cover 15 is most preferably provided in the case in which the starter/auxiliary equipment unit 20 is installed within the first building 23. In the case of installation outside the first building 23, the sound proof cover 15 may serve as a weather proof covering making the outer surface of the soundproofing cover 15 water resistant. In such a case, although of course omitted in the figures, the ceiling portion is also covered, so that it is not exposed to rain.

As described above, by disposing the auxiliary equipment 22 on the upper surface of the lubricating oil main tank 1, a compact starter/auxiliary equipment unit 20 is formed so that, it is possible to greatly reduce the floor area of the plant. Furthermore, the cost involved in transportation may be reduced. Also, installation, and maintenance may be accomplished with a single crane in order to greatly reduce the total costs involved in the construction of the plant.

FIG. 4 is a detailed side view of a gas turbine generator plant in accordance with one embodiment of present invention. In the FIG. 4, a first a building 23 and a second building 24 are provided on a foundation 50. The roof of the first building 23 is lower than the roof of the second building 24. An intake air system 25, which conducts air suction of the gas turbine, is provided on top of the roof of the first building 23. The generator 81 and the starter/auxiliary equipment unit 20, both depicted in FIGS. 2 and 3 and directly connected to each other, are installed within the first building 23. A small maintenance crane 21 is installed in the ceiling of the building 23. The maintenance the auxiliary equipment 22, and the withdrawal of the rotors of generator 81 are conducted using the crane 21.

The roof of the second building 24 is higher than the roof of the first building 23. A large maintenance crane 26 is installed in the ceiling of the second building 24. Gas turbine unit 80 is disposed within the second building 24. The hoisting and the lowering of the gas turbine rotor 27 is conducted using the large maintenance crane 26.

As described above, the large maintenance crane 26 and the small maintenance crane 21 are used in a dedicated fashion. Thus it is possible to use the small lightweight maintenance crane 21 so that the roof of the first building 23 may be made lower than the roof of the second building 24. A shortening is also possible in the axial direction. Furthermore, an intake air system 25 is installed on the roof of the first building 23 so that the arrangement is compact. Thus, it is possible to minimize loads resulting from wind, earthquakes, and similar.

Figure 5:
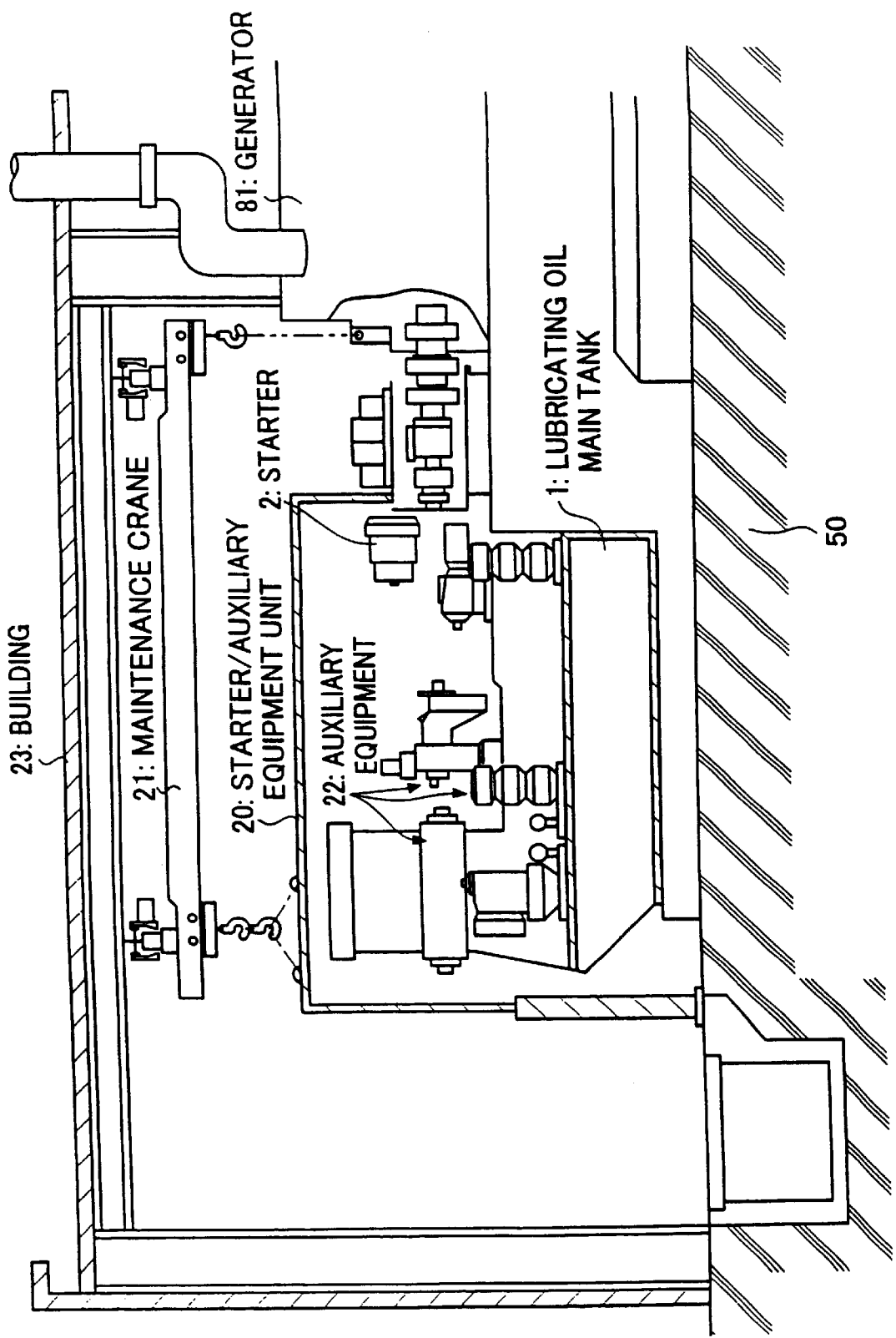
FIG. 5 is a side view showing the details of the structure in the vicinity of the starter/auxiliary equipment unit and maintenance crane in a gas turbine generator plant in accordance with an embodiment of the present invention.

FIG. 5 is a side view showing the starter/auxiliary equipment unit 20 and maintenance crane 21. The small maintenance crane 21 is disposed in the first building 23. The auxiliary equipment 22 is disposed on the upper surface of the lubricating oil main tank 1 and is made unitary therewith, so as to form the starter/auxiliary equipment unit 20.

When the rotors of the generator 81 are withdrawn, the cover is removed using the maintenance crane 21, and the upper half of the lubricating oil equipment on top of the lubricating oil main tank 1 is dismantled hooks are attached to the rotors of the generator 81 using the crane 21 from the side of the lubricating oil main tank 1. The hooks are then moved in the axial direction to withdraw the rotors from the generator 81.

As described above, in the gas turbine generator plant of the present invention, auxiliary equipment 22 including is disposed on the upper surface of the lubricating oil main tank 1 to form a starter/auxiliary equipment unit 20. The and this starter/auxiliary equipment unit 20 and a generator 81 are disposed within a first building 23, and a dedicated small maintenance crane 21 is disposed on the ceiling of the first building 23. An intake air system 25 is disposed on the upper part of the roof of the first building 23. The roof of the building 24 is higher than the roof of the first building 23 and the gas turbine unit 80 is disposed in the second building 24. A large maintenance crane 26 is installed on the ceiling of the second building 24, and the plant setup is conducted in the following order: (1) starter/auxiliary equipment unit 20; generator 81, and (3) gas turbine unit 80.

By conducting the installation in this manner, it is possible to lower the roof of the first building 23, which houses the starter/auxiliary equipment unit 20 and the generator 81. By installing the intake air system 25 on the upper part of the roof of the first building 23, the axial direction may be shortened and the floor area may be reduced. Furthermore, the auxiliary equipment 22 is installed on the upper surface of the lubricating oil main tank 1 to form the starter/auxiliary equipment unit 20, so that the auxiliary equipment 22 is made unitary. Thus, transportation, installation, and maintenance become simple and a reduction in cost is achieved. Furthermore, dedicated cranes are employed so that it becomes unnecessary to install maintenance cranes for each piece of auxiliary equipment.

All operations relating to maintenance may be executed using the small crane 21 and the large crane 26.

The size of the maintenance crane 21 may be reduced, so that the crane 21 as a whole, may be made small and light. If the crane can be made light, then the crane girder thin, and to reduce the size of the crane beam. As a result, the crane becomes less expensive; and the motor capacity is reduced. The reduction of the motor capacity allows power lines and instrument wiring to be made thinner, and installation thereof becomes a simpler matter.

If the crane 21 is smaller and more lightweight than a crane conventionally used, it is possible the roof of building 23 may be lowered. Accordingly, the amount need for the wall material of building 23 may be reduced, and thus a reduction in cost may be achieved. Furthermore, the building construction materials may be made thinner by the amount of the load ratio of crane 21. and, the effective space within the building is increased. Furthermore, the load with respect to wind and earthquakes may be reduced on both the intake air filter and silencer, which are provided on the roof of the building 23.

Furthermore, the starter 2 may be provided on the lubricating oil main tank 1, to shorten the axial direction of building span of the starter 2 side within the building 23. A reduction in the span of the building pillar results in a large reduction in cost of the roof and the building construction material. In other words, the beams are made thinner. Furthermore, the cable trench in the rear of starter 2 is also shortened which allows a reduction in the concrete volume, and a shortening of the cable length. Furthermore, the intake air ducts may also be shortened, and the weight thereof may be reduced, to simplify the design of the building.

The gas turbine generator plant of the present embodiment, having the auxiliary equipment made into a unit, alloys the installed floor area of the plant may be dramatically reduced. The unitary auxiliary equipment may be transported in one piece, so that transportation costs can be reduced. In addition there are few points of installation, so that installation costs may be reduced. Furthermore, maintenance is easier due to dedicated cranes.

The roof of the building housing the gas turbine unit is made high, and the roof over the generator and the unitary auxiliary equipment is made low so that a large crane and a small may be installed, respectively. The rotors of the generator may be maintained using the small crane, while the rotors of the gas turbine may be maintained using the large crane. For this reason, the building in which the small crane is installed may be reduced in weight to achieve a cost savings.

By providing a intake air system on the lower roof, the installed floor area of the plant may be further reduced.

When the auxiliary equipment is made unitary, all of the starter, the control device, and the lubricating oil device are provided on the upper surface of the lubricating oil main tank. Thus, the density of the unit becomes higher, to reduced the installed floor area and to lower the costs of transportation, installation, and maintenance.

Figure 6:
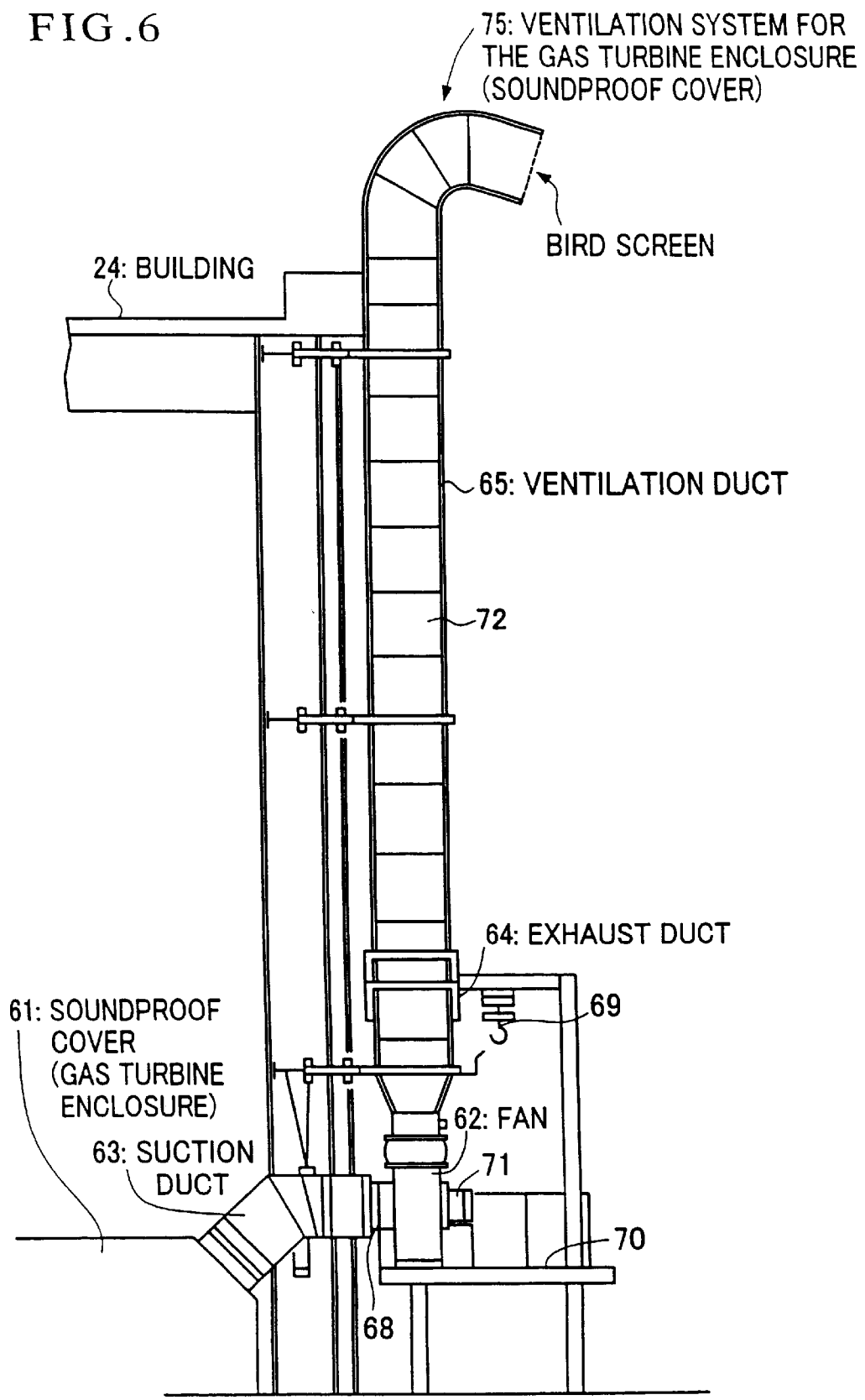
FIG. 6 is a front view showing a ventilation system of the gas turbine enclosure for the gas turbine generator plant in accordance with an embodiment of the present invention.
Figure 7:
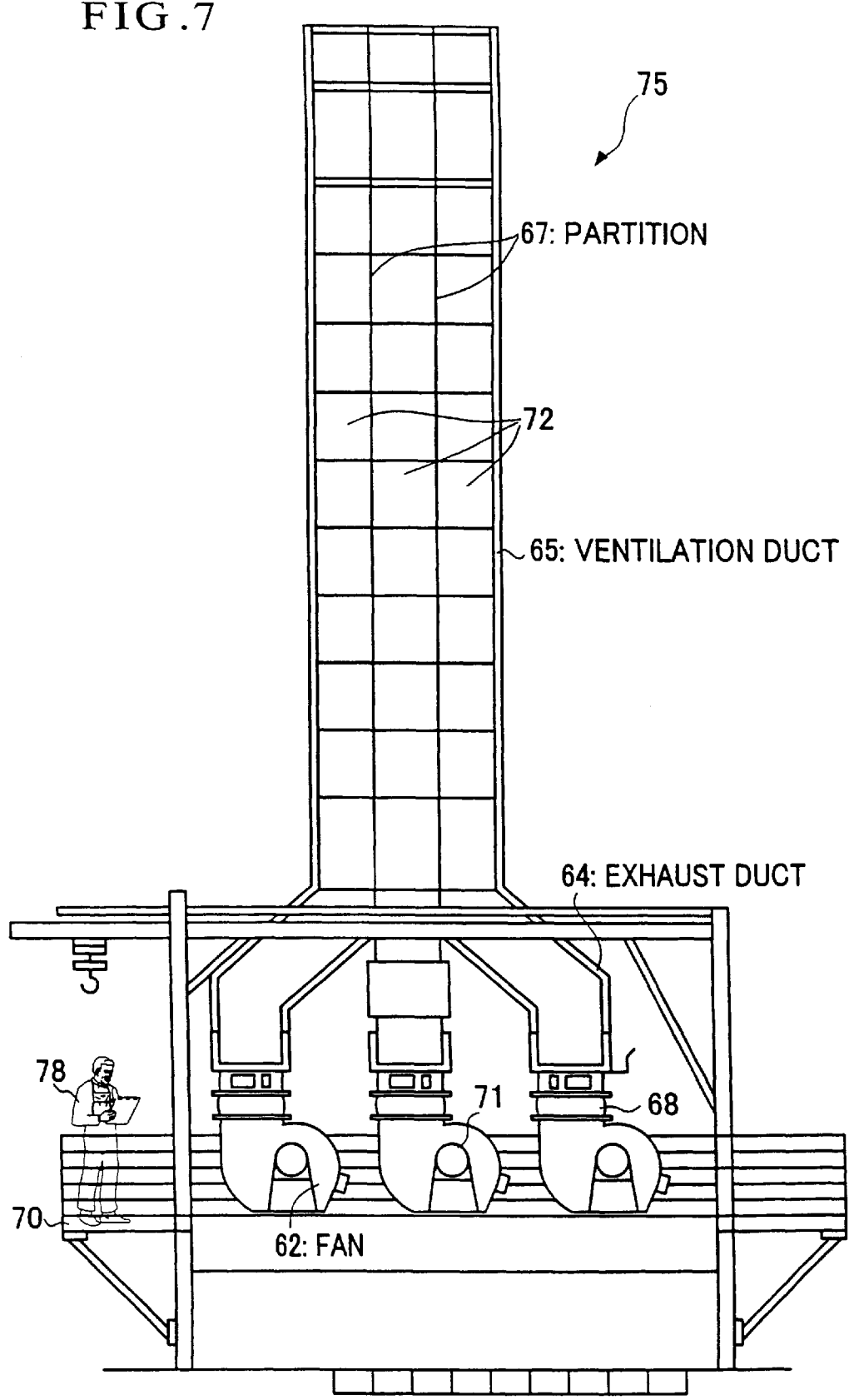
FIG. 7 is a side view showing the ventilation system of the gas turbine enclosure for the gas turbine generator plant in accordance with an embodiment of the present invention.

FIG. 6 is a front view showing a ventilator of a ventilation system 25 of the gas turbine enclosure for the gas turbine generator plant described above. FIG. 7 is a side view of the ventilation system 75. The actual size of the ventilation system is illustrated by a comparison with the human being 78, having a height of 180 cm, depicted in FIG. 7.

In both figures, in order to prevent the external propagation of the large amount of noise produced by the gas turbine and to contain suction noise, combustion noise, exhaust noise, rotational noise, and similar, a soundproof cover 61 is provided so as to enclose the entirety of a casing (not shown), at the outer periphery thereof, the casing contains rotating blades, rotors, and similar operated by high temperature combustion gas. A labyrinth and stationary blades are attached to an inner side of the casing. The labyrinth and stationary blades are disposed so as to provide a predetermined gap with respect to the chips of the rotating blades.

The gas turbine generator plant of the present invention has a soundproof cover 61 enclosing the gas turbine unit 80, in order to reduce the noise generated by the gas turbine unit 80. The gas turbine generator also includes a ventilation system 75, located outside of and adjacent to the soundproof cover 61, for ventilating the interior of the soundproof cover 61, for limiting the temperature increases therein, and for maintaining the interior of the soundproof cover 61 at an allowed temperature or below.

Furthermore, three suction ducts 63 are attached to the top part of the soundproof cover 61 and form branching ducts. One end of each of the three suction docts 63 communicates with the interior of the soundproof cover 61. A second end of each of the three suction ducts 63 communicates with the suction port of fan 62. To each of the three suction ducts 63 exhaust and ventilate an amount of air, which must be exhausted from within the soundproof cover 61 (hereinbelow referred to as "the amount of ventilated air") in order to maintain the temperature within the soundproof cover 61. The temperature of the interior of the soundproof cover 61 rises as a result of heat radiating from the outer circumferential surface of the casing, at approximately 60° C.

The three suction ducts 63 permit the soundproof cover 61 to be coupled with the fan 62 and send the air within the soundproof cover 61 to the suction port of fan 62. The three suction ducts 63 commonly provide for a sufficient exhaust of the amount of ventilated air and for the ventilation of the interior of the soundproof cover 61, without increasing the flow rate, and while using only two of the three suction ducts 63. Here, even when ventilation of the interior of the soundproof cover 61 is conducted using any two of the three suction ducts 63, the ventilation of the entire area within the soundproof cover 61 is conducted approximately uniformly, and a position is selected so that localized increases in temperature do not occur, and the ducts are coupled to the top part of the soundproof cover 61.

The cross-sectional area of each of the three suction ducts 63 is set to a size enabling a flow rate of the exchanged air which, when 50% of the capacity of the amount of ventilated air is caused to flow, avoids the undesirable effects caused either as a result of both an increase in air resistance and the need for increasing the delivery pressure of fan 62 when the flow rate of the ventilated air increases, or the generation of noise as a result of the air passing therethrough.

Furthermore, the fans 62, which are interposed in the suction ducts 63 coupled to the soundproof cover 61 and which exhaust the heated air within the soundproof cover 61, have a fan capacity which is 50% of the amount of ventilated air described above. Three such fans are disposed in parallel. During operation, two of these three fans are used in normal condition operations, while the other remains in a stand-by condition. The fan in stand-by condition acts as a reserve unit, having incorporated thereinto a sequence permitting immediate operation when a fan malfunctions during operation.

Furthermore, the delivery pressure of the fans 62 is set at an extremely low level of approximately 20 mm A9. Although the delivery amount is large, the fan capacity is small, so as to reduce running costs.

In other words, as described above, the cross-sectional area of the suction ducts 63 is made large, and the cross-sectional area of the ventilation ducts 65 to be described hereinbelow is also made large, and the flow path resistance is reduced, thus the ventilation of the interior of the soundproof cover 61 can be sufficiently conducted even when fans 62, having an extremely low delivery pressure, are employed.

Furthermore, the motors 71 driving the fans 62 employed may be ones in which, where necessary, an explosion proof motor has been used.

Furthermore, the three exhaust ducts 64 which are disposed in parallel at the exhaust ports of fans 62 and form a branched duct in a similar manner, flow together and become one at a position which is, as may be surmised from the height of the person 78 depicted in the figure, approximately 3 meters higher than the exhaust ports of the fans 62.

The ventilation duct 65 formed by the three exhaust ducts 64 is provided in an upright manner along the side wall of building 24 and extending to the roof of building 24, in which gas turbine unit 80 is disposed, in order to comply with regulations concerning the prevention of explosions.

Figure 8:
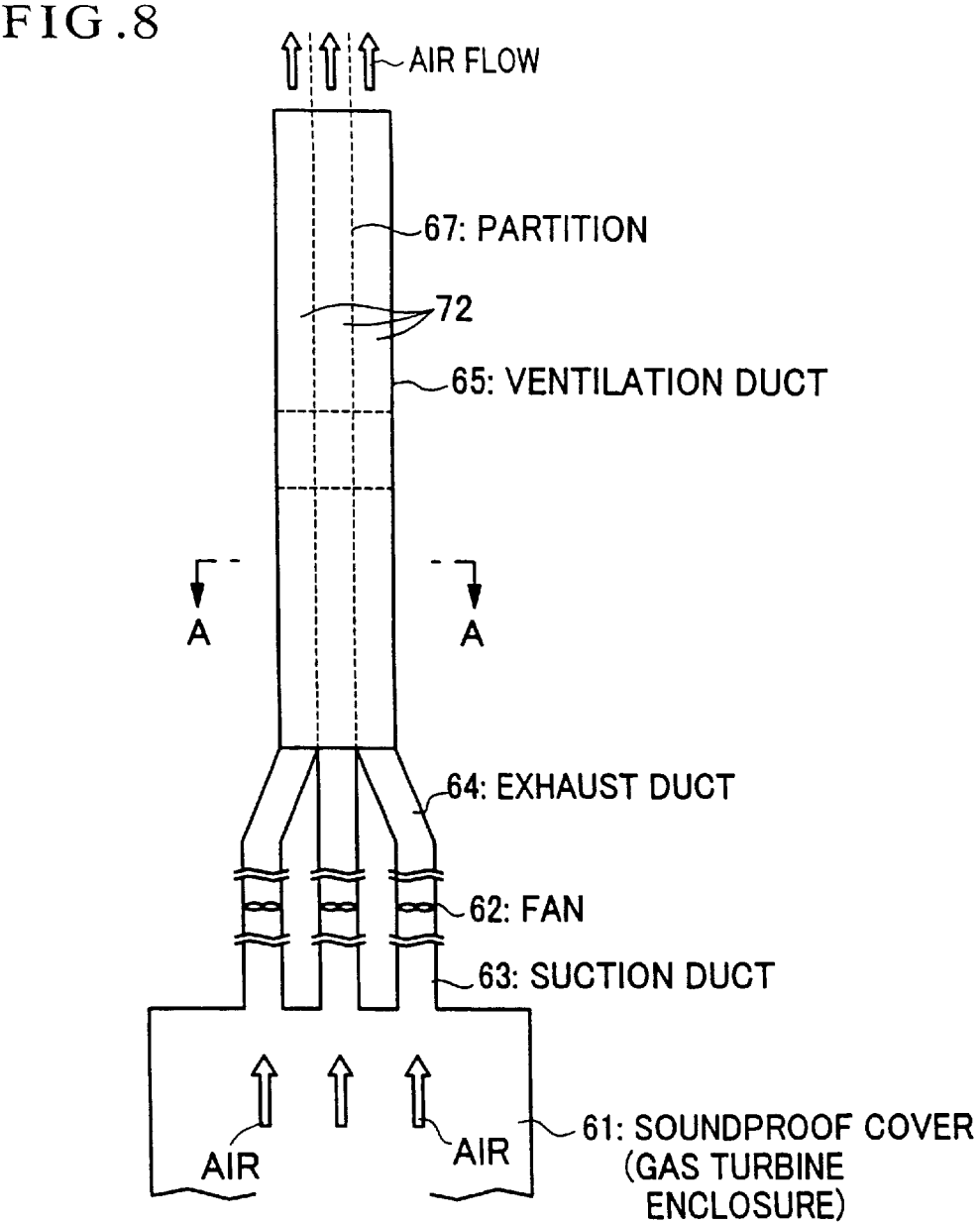
FIG. 8 is a front view showing the essential parts of a ventilation duct of a gas turbine generator plant in accordance with an embodiment of the present invention.
Figure 9:
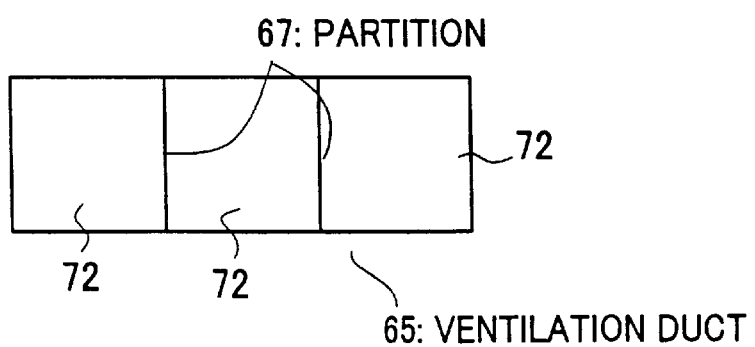
FIG. 9 is a cross-sectional view taken along the line 9—9 in FIG. 8.
Figure 10:
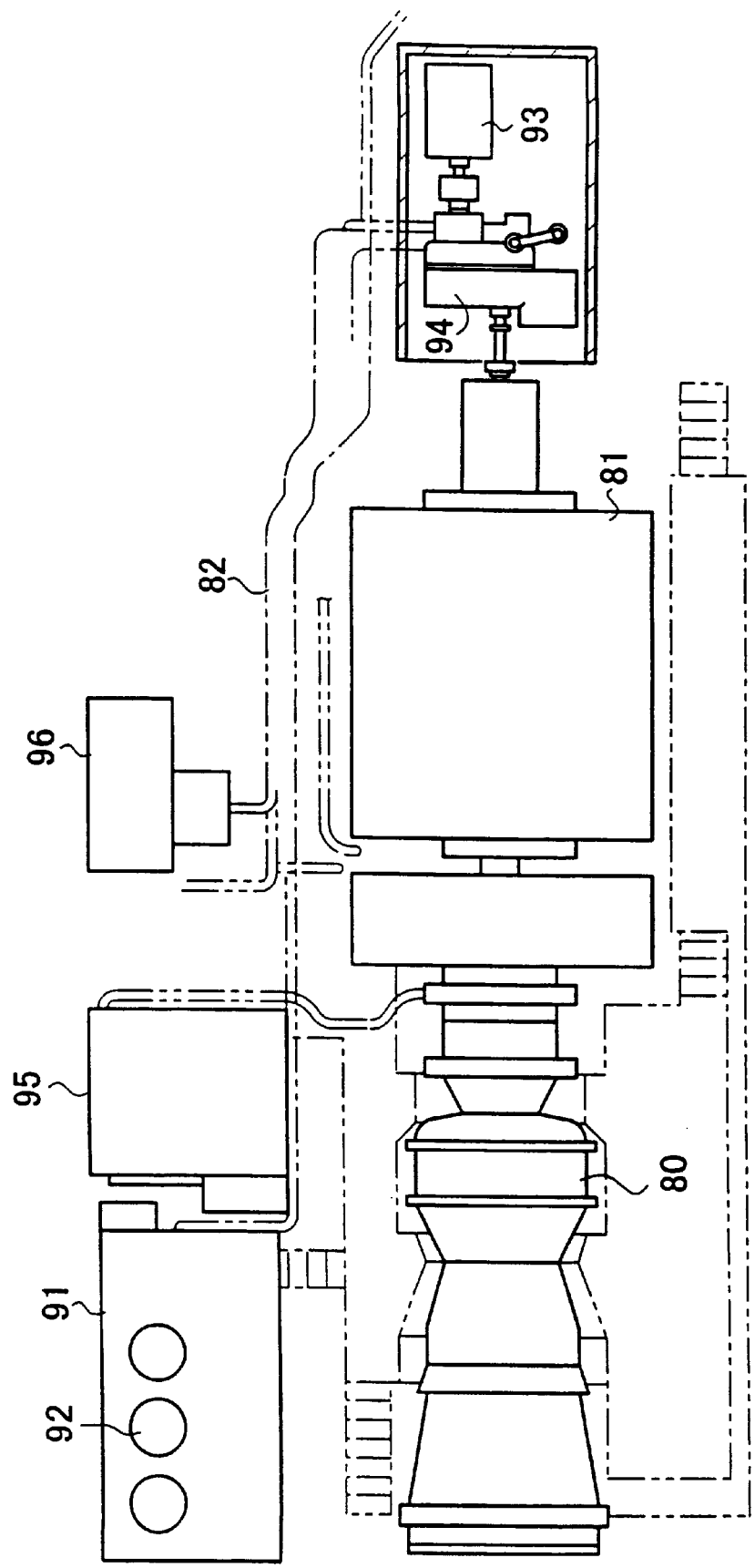
FIG. 10 is a top view showing the entirety of the structure of a conventional gas turbine generator plant.

Furthermore, as shown in FIGS. 8 and 9, the ventilation duct 65 has, to outward appearances, the rectangular shape of a single duct; however, it is provided with vertical partitions 67 in its interior, and the duct is thus divided into three flow paths 72 having a cross-sectional area such that, when an amount of ventilated air which is 50% of capacity is caused to flow, the flow rate is such that the flow path resistance does not increase; these flow paths 72 are coupled with the specific suction ducts 63 and fans 62.

In other words, the air exhausted from within the soundproof cover 61 flows independently, at 50% of the capacity of the amount of air ventilated, through two of the three flow paths which cover the entire length from the entrance to the suction duct 63 to the exit from the ventilation duct 65, and this air is then exhausted to the exterior. Furthermore, as a method of preventing the entrance of rain water into the exit part of the ventilation duct 65, the lead end part thereof is formed with a shape bent downward slightly from the horizontal, as shown in the figure, and a bird screen or the like is installed, and measures are taken for the prevention of the entry of foreign objects and for the prevention of rust, and thus the interior part of ventilation duct 65 is protected.

Furthermore, the lead end part of ventilation duct 65 may be turned freely in any direction in accordance with the conditions of the view of the region in which building 24 is erected.

The ventilation system 75 of the soundproof cover has a structure in which a gas turbine engine, soundproof cover 61, suction ducts 63, fans 62, exhaust ducts 64, ventilation duct 65 and building 24 are connected in a complex manner, so that with respect to phenomena such as earthquakes, vibration, and uneven subsidence, and the like, and particularly with respect to uneven subsidence, it is difficult to estimate which part will subside, so that provisions are made for making plus/minus adjustments in the base plate of fans 62.

As a method for compensating for the incongruities arising from such phenomena, methods have been considered such as the use of separation measures in which expansions 68 are provided at the entry and exit of fans 62, and the installation of shut off dampers, not depicted in the figure, for use during the operation of extinguishing devices.

Furthermore, the provision of shut off dampers on the suction port side of fans 62 allows 50% of the ventilated air exhausted from within the soundproof cover 61 described above to pass independently through each of two flow paths 72 among the three flow paths 72 existing from the entry of suction ducts 63 to the exit from ventilation duct 65, and allows this air to be exhausted to the exterior, and in addition, even during the operation of the gas turbine, this has the advantage of permitting the maintenance, inspection, and reconditioning and the like of, in particular, the fans 62, which have a high trouble frequency.

A hoist 69 is provided at a height facilitating maintenance of fans 62, such as the overhaul and inspection there of, and additionally, and a duct arrangement is considered which forms "the normal height" installation in commercial gas turbine facilities, so that a walk-way 70 is provided and regular patrols can be made from the ground level to the installation points, and thus access which is not different from that of standard machinery installed above ground is contemplated. For this reason, general overhaul and inspection may be conducted on-site, and where further overhaul and inspection is required, it is possible to convey the machinery to the ground level.

In other words, in general, inspection or maintenance of machinery installed at high positions is conducted by readying a truck crane each time such an operation becomes necessary, and the access of standard installations is such that installation costs are high, so that a provided hoist 69, a walk-way 70, and the like are generally not provided; however, in the ventilation system provided of the gas turbine enclosure in the present embodiment, such hoists and walk-way are extremely important in order to achieve continuous operation of the gas turbine, and there is not a feeling of fear at being at a high place during inspection and maintenance, and operations can be conducted with the feeling that one is standing on the earth, so that a hoist 69 and a walk-way 70 are provided, and access and good operating characteristics are provided.

By means of this ventilation system of the gas turbine enclosure, the maintenance of one of the fans can be conducted freely and easily during operation of the gas turbine, and by conducting a fan actuation operation having a sequence in which a back up fan is immediately started up when one of the fans fails down, operation is possible in which 100% of the capacity of the amount of ventilated air can be guaranteed in all cases. Accordingly, it is possible to always maintain the interior of the soundproof cover at or below an acceptable temperature, and it is thus possible to prevent deformation in the casing. By means of this, it is possible to completely prevent the occurrence of problems accompanying casing deformation which make emergency stoppage of the gas turbine inevitable, and to avoid the occurrence of serious accidents.

Furthermore, it is possible to reduce the installed range of the ducts, and furthermore, in order to prevent the mutual interactional rotation of the fan exhaust air, it is no longer necessary to provide check valves, switching dampers, or the like, at the fan exits, and compactness is thus achieved, and a reduction in weight and low cost become possible. Furthermore, the operation, maintenance, and inspection of the gas turbine becomes easy, and even during fan failer, recovery is possible without stopping the gas turbine, and this makes the continuous operation of the gas turbine possible.

Furthermore, installation is conducted at a high position, so that consideration is given to operation and safety, and the overall combination is superior.

Accordingly, depending on the type of gas turbine, temperatures may reach 150° C. or above, and it is necessary to employ various measures to prevent the deformation of the casing, while at the exhaust end, coolers and the like are required, while in contrast, in this ventilator of the soundproof cover, the air within the soundproof cover can be exhausted using a small fan capacity, and it is easily possible to maintain the temperature within the soundproof cover at the acceptable temperature of 60° C. or below.

What is claimed is:

1. A gas turbine generator plant comprising:
    a gas turbine unit;
    a generator for changing motive power, generated by said gas turbine unit, into electric power;
    a lubricating oil tank for storing the lubricating oil; and
    auxiliary equipment including:
        a starter acting as a torque converter which transmits driving force of a starting motor into said generator and said gas turbine unit;
        a lubricating oil device for supplying lubricating oil to said auxiliary equipment; and
        a control oil device for supplying control oil to said auxiliary equipment, wherein said auxiliary equipment is arranged on top of said lubricating oil tank; and
    wherein all three of said auxiliary equipment, said generator, and said gas turbine unit are arranged to be aligned in first, second, and third order, respectively, with respect to either a front wall or a back wall of a building, and within said building.

2. The gas turbine generator plant according to claim 1, wherein a first soundproof cover is provided so as to cover said auxiliary equipment.

3. The gas turbine generator plant according to claim 2, wherein said building has a first roof above said gas turbine unit and a second roof above both said auxiliary equipment and said generator, said first roof being higher than said second roof.

4. The gas turbine generator plant according to claim 3, wherein a first maintenance crane is provided within said building at a side of said gas turbine unit and a second maintenance crane is provided at a side of said auxiliary equipment.

5. The gas turbine generator plant according to claim 4, wherein an intake air system is provided on said second roof above both said auxiliary equipment and said generator.

6. The gas turbine generator plant according to claim 1, wherein a second soundproof cover covers said gas turbine unit, in order to reduce noise generated by said gas turbine unit, and a ventilation system, located outside of and adjacent to said second soundproof cover, for ventilating an interior of said second soundproof cover, in order to limit temperature increases therein, and in order to maintain said interior of said second soundproof cover at or below an allowed temperature.

7. The gas turbine generator plant according to claim 6, wherein said ventilation system includes:
    a ventilation duct provided vertically with respect to said building in which said gas turbine unit is disposed;
    three exhaust ducts branched from an end of said ventilation duct;
    three suction ducts each connected to said second soundproof cover; and
    three fans each between one of said three exhaust ducts and one of said three suction ducts, wherein each fan has a capacity capable of moving approximately 50% of a total amount of air which must be exhausted from within said second soundproof cover.

8. The gas turbine generator plant according to claim 7, wherein a shut-off damper is provided on a suction port side of said fans.

9. A gas turbine generator plant comprising:
    a gas turbine unit;
    a generator for changing motive power, generated by said gas turbine unit, into electric power;
    a lubricating oil tank for storing the lubricating oil; and
    auxiliary equipment including:
        a starter acting as a torque converter which transmits driving force of a starting motor into said generator and said gas turbine unit;
        a lubricating oil device for supplying lubricating oil to said auxiliary equipment; and
        a control oil device for supplying control oil to said auxiliary equipment, wherein said auxiliary equipment is arranged on top of said lubricating oil tank;
    wherein all three of said auxiliary equipment, said generator, and said gas turbine unit are arranged in a first, second, and third order, respectively, with respect to either a front wall or a back wall of a building, and within parts of said building, wherein said building has a first roof above said gas turbine unit and a second roof above both said auxiliary equipment and said generator, and said first roof is higher than said second roof;
    a first soundproof cover is provided so as to cover said auxiliary equipment;
    a first maintenance crane provided within said building at the side of said gas turbine unit and a second maintenance crane provided at the side of said auxiliary equipment;
    an intake air system is provided on said second roof above both said auxiliary equipment and said generator;
    a second soundproof cover covers said gas turbine unit for reducing noise generated by said gas turbine unit; and
    a ventilation system, located outside of and adjacent to said second soundproof cover, for ventilating an interior of said second soundproof cover, for limiting temperature increases therein, and for maintaining said interior of said second soundproof cover at or below an allowed temperature, wherein said ventilation system includes:

a ventilation duct provided outside of a top part of said second soundproof cover and provided vertically to said building in which said gas turbine unit is disposed;

three exhaust ducts provided outside of a top part of said second soundproof cover so as to branch off from an end of said ventilation duct;

three suction ducts provided outside of a top part of said second soundproof cover, wherein each of said three suction ducts is connected to said second soundproof cover; and three fans provided outside of a top part of said second soundproof cover, wherein each of said three fans is located between one of said three exhaust ducts and one of said three suction ducts, and each of said three fans has a capacity capable of moving approximately 50% of a total amount of air which must be exhausted from within said second soundproof cover;

a shut-off damper provided outside of a top part of said second soundproof cover and provided on a suction port side of each of said three fans; and a walk-way and hoist provided outside of a top part of said second soundproof cover.

* * * * *